Jan. 26, 1965 E. H. SCHULTZ, JR 3,166,780
CASTER CONSTRUCTION
Filed June 2, 1961
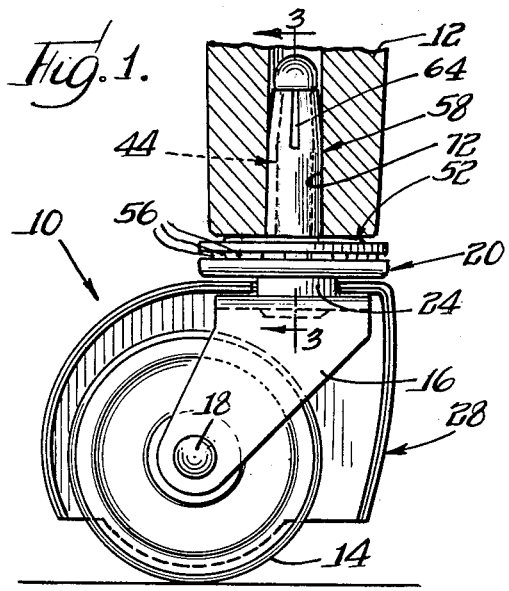
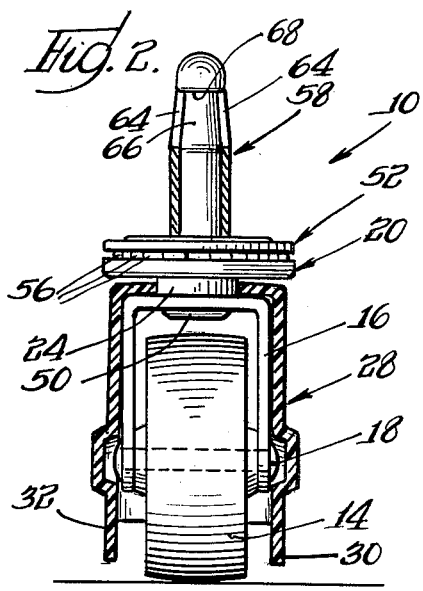
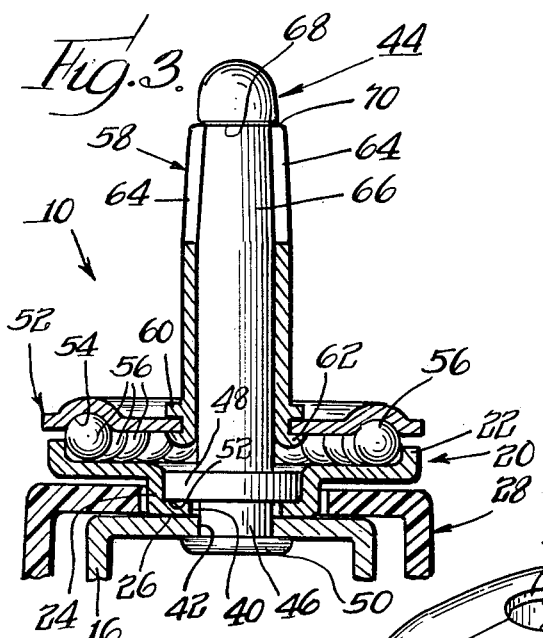
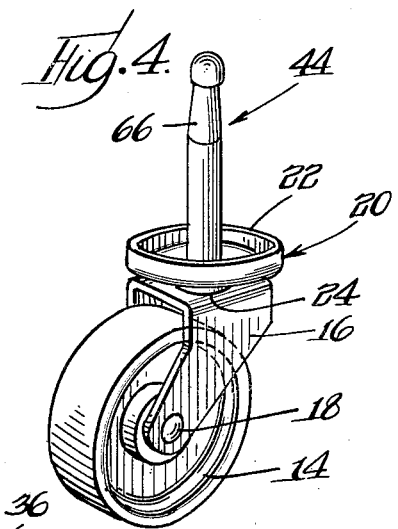
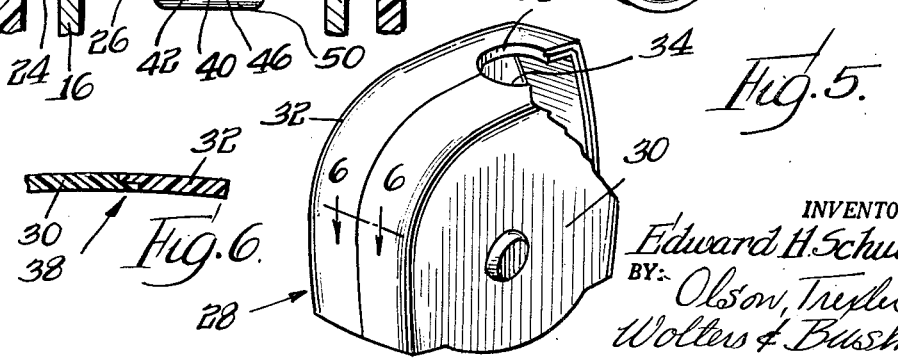
INVENTOR.
Edward H. Schultz, Jr.
BY: Olson, Trexler,
Wolters & Bushnell
attys.

United States Patent Office 3,166,780
Patented Jan. 26, 1965

3,166,780
CASTER CONSTRUCTION
Edward H. Schultz, Jr., Chicago, Ill., assignor to Nagel-Chase Manufacturing Company, Chicago, Ill., a corporation of Illinois
Filed June 2, 1961, Ser. No. 114,484
3 Claims. (Cl. 16—21)

This invention relates generally to casters and especially to casters incorporating anti-friction bearings.

One common scheme of assembling a caster to a piece of furniture relies on a separate socket element which is driven into the furniture structure. A pintle which upstands from the caster is inserted into this socket and is allowed to rotate therein defining the swivel axis of the caster. Because of the axial freedom which is allowed the pintle in such an arrangement and because of the necessarily loose fit of the pintle in the socket, casters so constructed frequently depend on two or more ball bearing races to achieve the desired smoothness of action and to realize acceptance of the lateral thrusts occasioned by unbalanced loading. Such caster structures have proved expensive to manufacture due to the provision of the multiple races. Moreover, these multiple-race casters have proved difficult to enclose in a housing.

Accordingly, an important object of the present invention is to provide a caster that is simple and economical to manufacture.

A more general object of the invention is to provide a new and improved caster construction.

Another object of the invention is to provide a caster which is amenable to being enclosed in a housing.

Yet another object of the invention is to provide a caster in which proper spacing for the ball bearing race is automatically determined.

A further object of the invention is to provide a caster of strong construction which is easy to operate.

Additional objects and features of the invention pertain to the particular structure and arrangements whereby the above objects are attained.

A structure in accord with the invention includes a roller-supporting frame, a roller journaled on the frame, a lower, ball race fixed to the frame, a stem rigidly upstanding from the frame and from the lower race, an upper, ball race aligned over the lower race, ball bearings between the races, and a sleeve fixed to the upper race in upstanding relationship rotatably to receive the stem.

The invention, both to its structure and mode of operation, will be better understood by reference to the following disclosure and drawing forming a part thereof, wherein:

FIG. 1 is a side elevational view of a furniture leg and a supporting caster constructed in accordance with the invention, the housing of the caster being cutaway to reveal details of the caster and the leg of the furniture piece being shown in central section to further the disclosure;

FIG. 2 is an end elevational view of the caster of FIG. 1;

FIG. 3 is an enlarged view taken through the section 3—3 of FIG. 1;

FIG. 4 is a reduced scale perspective view of the caster of the invention shown with the upper race, the upright sleeve and the ball bearings removed;

FIG. 5 is a fragmentary perspective view of the housing used with the caster of FIG. 1; and FIG. 6 is an enlarged view taken through the section 6—6 of FIG. 5.

Referring now in detail to the drawing, specifically to FIG. 1, a caster indicated generally by the numeral 10 will be seen mounted in supporting relationship with a leg 12 of a piece of furniture. The caster 10 includes a floor-engaging roller 14 which is journaled on a yoke or frame 16 by means of an axial 18.

The caster 10 also includes a plate-like member 20 having a circular wall 22 upraised at the periphery thereof to define a lower, ball race as is shown in FIG. 3. The plate-like member 20 is also provided with a depending, central portion 24, the lower surface of which defines a shoulder 26 which abuts the upper surface of the frame 16. The depending portion 24 defines thereabout a circumferential groove between the frame 16 and the remaining portion of the plate-like member 20. This groove provides the means for mounting a resinous plastic housing 28 to the caster 10.

Turning to FIG. 5, the housing 28 will be seen to comprise two side shells, shells 30 and 32. The shells 30 and 32 are provided with opposed, semi-circular notches 34 and 36 respectively; and the edges of these notches embrace the external sidewall of depending portion 24 in assembling the housing 28 to the caster 10. The shells 30 and 32 are joined at their confronting edges by suitable means such as the overlap joint arrangement 38 shown in FIG. 6.

Returning to FIG. 3, the depending portion 24 of the member 20 will be seen fashioned with a central aperture 40 which is aligned over a corresponding aperture 42 formed in the frame 16. The caster 10 includes a stem or pintle element 44. The plate-like member 20 and the frame 16 are fixed together and to the pintle 44 by means of a stem portion 46 of the pintle entering the aligned apertures 40 and 42 in the member 20 and the frame 16 respectively. The pintle 44 incorporates a radial flange 48 overlying the horizontal section of portion 24, and the lower end of the pintle 44 is peened over forming a head 50 that constrains the frame 16 and the portion 24 against a shoulder 52 defined by the flange 48. The caster, as thus far described but without the housing 28, is shown in perspective in FIG. 4.

Continuing with particular reference to FIG. 3, the caster 10 will be seen to comprise a second, plate-like member 52 rotatably overlying the member 20. The plate-like member 52 is fashioned with a downwardly opening, annular groove 54 defining an upper, ball race; and as will be seen in the drawing, a multiplicity of ball bearings 56 are confined between the members 20 and 52, being generally constrained in position by the wall 22 and the sidewalls of groove 54.

A tubular element or sleeve 58 is provided with a radial flange 60 spaced from its lower end; and this lower end of the element 58 is passed through a cooperatively shaped, central aperture formed in the plate-like member 52 in order that the edges of the lower end of the element 58 can be peened over forming a head 62. Thus, the edges of the central aperture of member 52 are secured between the annular flange 60 and the head 62; and the plate-like member 52 is rigidly attached to the tubular element 58.

The tubular element 58 is provided with diametrically disposed, longitudinal slots 64 opening from the free end of the element 58. This free end of the element 58 is provided with slightly converging sides, the slots 64 allowing flexing of the free ends of the tubular element 58 upon passage of the pintle 44 therethrough. While the slots 64 are shown as extending approximately one-third the length of the element 58, it is to be recognized that these slots can be further elongated so as to facilitate passage of a pintle through a sleeve more closely fitting thereabout.

It is to be observed that the pintle 44 is provided with a tapering section 66 that corresponds to the tapering section of the tubular element 58, the tapering section 66 of pintle 44 terminating in an annular shoulder 68 that confronts the top edge 70 of the element 58 when the two parts are properly assembled. In accordance with a feature of the invention, the axial dimensions of the pintle 44 and the tubular element 58 are selected so that, when the edge 70 abuts the annular shoulder 68, proper spacing between the members 52 and 20 is established for operation of the ball bearings 56.

In order to provide long and useful life for the caster 10, the members 20 and 52 and the ball bearings 56 are suitably hardened; and in this regard, it is important to note that there is no necessity for hardening the frame 16. Thus, a single size ball race arrangement can be employed with wheels and wheel frames of a variety of sizes when casters are constructed in accordance with the invention.

For purposes of affording a more complete understanding of the invention, it is advantageous now to provide a functional description of the mode in which the component parts cooperate.

Having assembled the plate-like member 20 to the frame 16 and to the pintle 44 as has been hereinabove described and having assembled the plate-like member 52 to the tubular element 58 as has also been hereinabove described, the ball bearings 56 will be positioned in the annular groove 54 and the pintle 44 will be urged into the tubular element 58 until the shoulder 68 emerges and abuts the free edges 70. In this condition, proper spacing between the members 20 and 52 will have been established by the dimensions of the parts, and the caster is ready for assembly to a furniture structure.

With a vertically disposed, downwardly opening bore 72 formed in a furniture structure such as the furniture leg 12 illustrated in FIG. 1, the caster 10 may be assembled thereto by urging the tubular element 58 into the bore 72; and desirably, a press fit is arranged to exist between the tubular element 58 and the bore 72. If desired, the exterior sidewalls of the tubular element 58 may be provided with longitudinal knurls, not shown, further to enhance the gripping engagement between the tubular element and the walls of the bore. With the caster thus in final position, the shells 30 and 32 of the housing 28 are coupled together about the frame 16 with the edges of the notches 34 and 36 embracing the groove defined between the frame 16 and the plate-like member 20.

The specific example herein shown and described should be considered illustrative only. Various changes in structure will, no doubt, occur to those skilled in the art; and these changes are to be understood as forming a part of this invention insofar as they fall within the spirit and scope of the appended claims.

The invention is claimed as follows:

1. A caster comprising: means affixable to a furniture structure including an upper, ball race and a tubular element extending upwardly from said race in fixed relationship; means for rollably supporting said furniture structure disposed in swivelable relationship with said first means, including a lower, ball race aligned with said upper race and a pintle extending rigidly from said lower race into matable engagement with said tubular element; a plurality of similar sized ball bearings disposed between said races and cooperating with said upper race to prevent axial movement of said pintle relative to said tubular element in one direction; and means acting between said tubular element and said pintle to prevent axial movement of said pintle in the opposite direction, said ball races being relatively shaped to provide cooperating surfaces confining the ball bearings therebetween to predetermined relative positions in a single outer-most annulus spaced radially outwardly of the axis of the pintle which is fixed against axial movement relative to the tubular element when assembled to a furniture structure.

2. A caster comprising: a roller-supporting frame; a roller journaled on said frame; a first plate-like member fixed to said frame to define a lower, ball race; a stem rigidly upstanding from said frame and from said member; a second plate-like member rotatably overlying said first member and having a downwardly opening annular groove defining an upper, ball race; ball bearings between said races, a part of each of said bearings residing in said groove to be restrained against movement radially thereof; a sleeve securable to a furniture structure and fixed to said second plate-like member in upstanding relationship rotatably to receive said stem; and an annular shoulder on said stem spaced apart from said first member and confronting the top edge of said sleeve to cooperate in establishing the spacing between said first and second members whereby to retain said ball bearings in operative engagement with said groove.

3. A caster comprising: a roller-supporting frame; a roller journaled on said frame; a first plate-like member fixed to said frame to define a lower, ball race, said member having a depending central portion defining thereabout a circumferential groove between said frame and a remaining portion of said member; a roller housing having joinable shells with opposed, semi-circular notches, the edges of said notches being receivable in said circumferential groove; a stem rigidly upstanding from said frame and from said first member; a second plate-like member rotatably overlying said first member and defining an upper, ball race; ball bearings between said races; and a sleeve securable to a furniture structure and fixed to said second member in upstanding relationship rotatably to receive said stem.

References Cited in the file of this patent

UNITED STATES PATENTS

| | | |
|---|---|---|
| 836,199 | Morris | Nov. 20, 1906 |
| 1,094,744 | Palmer | Apr. 28, 1914 |
| 1,424,028 | Noelting | July 25, 1922 |
| 2,659,100 | Cramer | Nov. 17, 1953 |